UNITED STATES PATENT OFFICE.

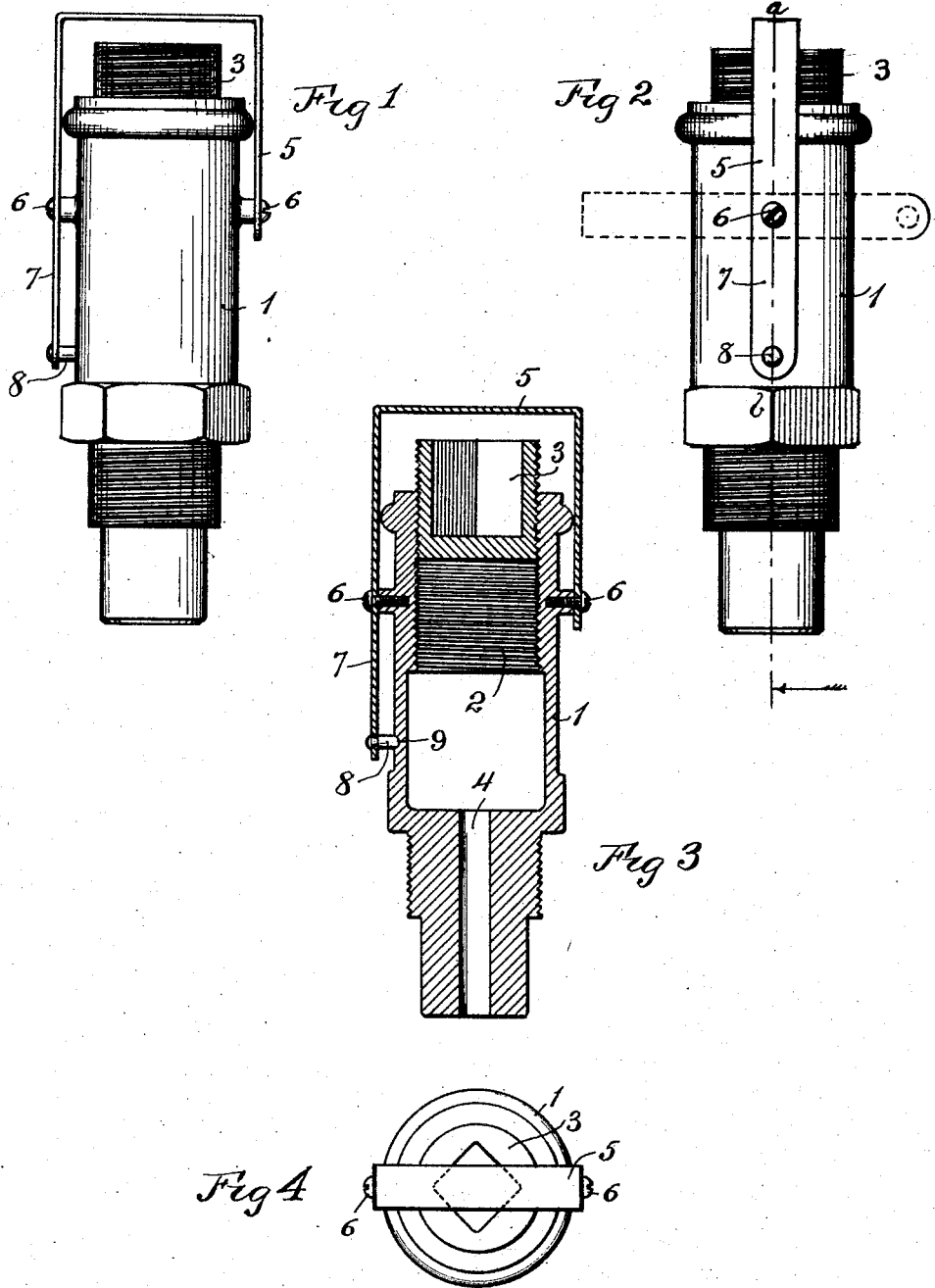

GEORGE W. THRAILKILL, OF KANSAS CITY, MISSOURI.

GREASE-CUP.

994,429.

Specification of Letters Patent. Patented June 6, 1911.

Application filed December 27, 1910. Serial No. 599,363.

*To all whom it may concern:*

Be it known that I, GEORGE W. THRAILKILL, a citizen of the United States, residing at Kansas City, in the county of Jackson and State of Missouri, have invented certain new and useful Improvements in Grease-Cups, of which the following is a specification.

My invention relates to improvements in grease cups.

It relates particularly to grease cups in which a screw threaded closure is fitted in a threaded opening through which the cup is filled with grease.

The object of my invention is to provide a simple and efficient means for limiting the outward movement of the closure in the filling opening, so that the closure will not work out.

In the accompanying drawings illustrative of my invention, Figure 1 is a side elevation of the preferred form of my invention, showing the bail in the locking position. Fig. 2 is a side elevation looking in a direction at right angles to the direction in which the device is viewed, as shown in Fig. 1. Fig. 3 is a central vertical section on the dotted line *a—b* of Fig. 2. Fig. 4 is a top view.

Similar reference characters denote similar parts.

1 denotes an ordinary grease cup, such as employed to feed the bearings of engines and other machinery. The cup is provided with a screw threaded opening 2 in which is removably fitted a screw threaded closure 3, which also serves as a piston to force the grease outwardly through the discharge opening 4.

Ordinarily much annoyance is occasioned by reason of the closure 3 working out of the opening 2 owing to the jarring to which the cup is subjected. To prevent the closure working out I preferably provide a locking member for limiting the outward movement of the closure 3 in the opening 2. This locking member is preferably an inverted U shaped bail 5 the two parallel arms of which are provided with horizontal holes through which respectively extend horizontal screws or pins 6 which are mounted in threaded holes disposed in diametrically opposite positions in the outside of the cup 1. The pins or screws 6 serve as pivots upon which the bail 5 may swing to and from the locking position shown in Fig. 1 and in solid lines in Fig. 2. When in this position the horizontal portion of the bail 5 is disposed so as to limit the outward movement of the closure 3, thereby preventing detachment of the closure from the cup. To releasably lock the bail 5 in the locked position, shown in Fig. 1 any suitable means may be provided. For this purpose I have shown one arm of the bail 5 provided with a resilient extension 7 having secured to it an inwardly extending pin 8 which is adapted, when the bail is in the locking position to enter a recess 9 provided in the outer side of the cup 1. The length of the pin 8 is such that when the bail is being swung from the position shown in dotted lines in Fig. 2 toward the position shown in solid lines in said figure the pin 8 will strike the cup 1 and force outward the resilient portion 7 until the pin is over the recess 9, at which time the said resilient portion will force the pin into the recess 9, thereby locking the bail in the locking position. To release the bail, it is but necessary to spring outward the resilient part 7 sufficiently to withdraw the pin 8 from the recess 9, after which the bail may be swung to the position shown in dotted lines in Fig. 2. When in the position shown in dotted lines in Fig. 2 the bail will not obstruct the removal of the closure 3 for the purpose of filling the cup 1. It will be noted that the bail 5 is normally disengaged from the closure 3, so that the closure may be readily turned to force grease from the cup.

I do not limit my invention to the structure shown and described as many modifications, within the scope of the appended claims, may be made without departing from the spirit of my invention.

Having thus described my invention, what I claim and desire to secure by Letters Patent, is:—

1. A grease cup having a screw threaded opening through which the cup is filled, a screw threaded closure fitted in said opening, the cup having a peripheral recess, a resilient member pivoted to the cup so as to swing to and from a position in which it will limit the outward movement of the closure, and a pin carried by said member and adapted to enter said recess when the member is in said position for locking the member in said position.

2. A grease cup having a screw threaded opening through which the cup is filled, a screw threaded closure fitted in said opening, a bail pivoted to the cup so as to swing to and from a position in which it will hold the closure from working out of said opening, the bail having a resilient portion, and a device carried by said resilient portion for engaging the cup to hold the bail in said position.

In testimony whereof I have signed my name to this specification in presence of two subscribing witnesses.

GEORGE W. THRAILKILL.

Witnesses:
E. B. HOUSE,
FLORENCE M. VENDIG.

Copies of this patent may be obtained for five cents each, by addressing the "Commissioner of Patents, Washington, D. C."